(12) United States Patent
Varady

(10) Patent No.: US 7,066,064 B1
(45) Date of Patent: Jun. 27, 2006

(54) METHOD AND APPARATUS FOR VIBRATION DAMPENING OF BARFEEDERS

(76) Inventor: Raymond O. Varady, 2 Harmon La., Collinsville, IL (US) 62234

( * ) Notice: Subject to any disclaimer, the term of this patent is extended or adjusted under 35 U.S.C. 154(b) by 142 days.

(21) Appl. No.: 10/286,196

(22) Filed: Nov. 1, 2002

Related U.S. Application Data

(60) Provisional application No. 60/336,271, filed on Nov. 2, 2001.

(51) Int. Cl.
*B23B 13/00* (2006.01)
(52) U.S. Cl. .............................. 82/127; 82/904; 82/124; 82/126
(58) Field of Classification Search ................. 82/127, 82/124, 125, 126, 903, 904; 414/14, 17
See application file for complete search history.

(56) References Cited

U.S. PATENT DOCUMENTS

| | | | |
|---|---|---|---|
| 3,660,949 A | 5/1972 | Coes, Jr. .................... 51/216 R |
| 4,011,510 A * | 3/1977 | Olsen .......................... 324/157 |
| 4,365,529 A * | 12/1982 | Neukomm .................... 82/163 |
| 4,406,190 A * | 9/1983 | Mason ......................... 82/127 |
| 4,638,693 A | 1/1987 | Sugimoto ..................... 82/2.5 |
| 4,733,758 A | 3/1988 | Duclos et al. .............. 188/267 |
| 4,941,782 A | 7/1990 | Cook ........................... 408/147 |
| 5,138,918 A | 8/1992 | Attardi et al. ............... 82/1.11 |
| 5,195,409 A * | 3/1993 | Smith ........................... 82/127 |
| 5,829,319 A | 11/1998 | Mokeddem .................. 74/574 |
| 5,957,016 A | 9/1999 | Segalman et al. ........... 82/1.11 |
| 5,992,582 A * | 11/1999 | Lou et al. ................ 188/267.1 |
| 6,095,486 A | 8/2000 | Ivers et al. ............. 251/129.01 |
| 6,098,509 A | 8/2000 | Drei et al. ..................... 82/127 |
| 6,122,998 A | 9/2000 | Iwashita ...................... 82/1.11 |
| 6,189,426 B1 * | 2/2001 | Segalman et al. ............ 82/117 |
| 6,202,806 B1 * | 3/2001 | Sandrin et al. .......... 188/267.1 |
| 6,253,650 B1 | 7/2001 | Drei et al. ..................... 82/127 |
| 6,267,364 B1 | 7/2001 | Zhang ............................ 269/7 |
| 6,568,470 B1 * | 5/2003 | Goodson et al. ........... 166/66.5 |

FOREIGN PATENT DOCUMENTS

JP   05212643   8/1993

OTHER PUBLICATIONS

Koelech, J.R. *Curing the Shakes. Machine Shop Guide,* vol. 5, No. 1 (Dec./Jan. 2000).
Varady, R and Rakowski, L. *The Long and Short of Bar Feeder Selection. Production Machining,* (Jul./Aug. 2001).
Sproston, J.L., Yanyo, L.C., Carlson, J.D., and El Wahed, A.K. *Controllable Fluids in 2002—Status of ER and MR Fluid Technology. Actuator 2002,* 8th International Conference on New Actuators, Jun. 10-12, 2002, Bremen, Germany.
Lord Materials Division, Lord Corporation. *Engineering Note. Designing with HR Fluids.* Revised Dec. 1999.

* cited by examiner

*Primary Examiner*—Willmon Fridie, Jr.
(74) *Attorney, Agent, or Firm*—Grace J. Fishel

(57) ABSTRACT

A barstock bar feeder with a guide channel for encasing a barstock in a electro- or magneto-rheological hydrostatic oil bearing. Electro- or magneto-field generators are provided along the guide channel for selectively applying a field to the guide channel for changing the viscosity of the oil in the guide channel to dampen barstock vibration in the barfeeder.

12 Claims, 3 Drawing Sheets

METHOD AND APPARATUS FOR VIBRATION DAMPENING OF BARFEEDERS

This application claims priority from provisional application Ser. No. 60/336,271, filed Nov. 2, 2001.

BACKGROUND OF THE INVENTION

1. Field of the Invention

The present invention relates to the application of electro- or magneto-rheological fluids to the dampening of vibration in a barfeeder. The invention is also directed to an improved barfeeder.

2. Brief Description of the Prior Art

A considerable segment of the metalworking manufacturing industry pertains to turning. In this process a metalworking lathe spins bars of various lengths and diameters at the appropriate revolutions per minute while cutting the workpiece with a tool to the specified shape or diameter. Metalworking lathes are driven mechanically by cams and other mechanical devices or electronically with the use of CNC (computer numeric control) and may be configured with a sliding or fixed headstock (spindle). The process has become accepted worldwide, is used in one form or another in most metalworking industries and variations on the process abound.

In turning, application engineers and their associated counterparts determine the best way to manufacture a particular part. Some parts are cast and then turned and drilled but this requires that each part be individually loaded into the lathe. Many manufacturers opt to form the part, if possible, from barstock as it can be continuously fed into the lathe with a barfeeder.

A barfeeder pushes a bar of selected diameter to the specified part length into the workspace of the lathe for part production. After the part is worked to completion and cut off, the lathe chuck automatically opens, signaling the barfeeder to push the bar material to the next working length and the cycle thus repeats.

In simplest form, a barfeeder requires an operator to manually reload the next bar of material for working. Taking automation one step further, a device called a magazine barloader not only feeds the bar material into the lathe, but also automatically reloads the next bar length providing a continuous supply of material to the lathe without operator intervention.

The North American standard length for barstock is 12 feet. Shops want to run their bar machines as fast as possible, typically at speeds in excess of 5,000 to 10,000 rpm, to achieve high production rates. Although a certain amount of the material is supported within the headstock or spindle of the lathe, the remainder of the material must be supported in the barfeeding device. As the rotating speed of a 12-foot bar increases, the barstock tends to whip and vibrate in the barfeeder, adversely affecting machining results.

There is a direct correlation between bar straightness and bar vibration experienced in the barfeeder. Steel manufacturers have responded to this need by refining their processes to provide straighter material to their turning manufacturing customers but non-ferrous materials are usually extruded as opposed to drawn (as most steels are) and the straightness cannot be as closely controlled. In addition, even if the barstock is straight when it leaves the manufacturer, it may be damaged in handling before it reaches the barfeeder of the turning customer. Hence vibration dampening in barfeeders remains as a big issue.

For precision production operations, vibration dampening is generally accomplished in one form or another (depending on the barfeeder manufacturer) by hydrodynamic suspension of the barstock in a guide channel mechanism with a heavy oil to dampen bar whip and vibration. This is generally effective until (1) the mass of the material (normally associated with diameter) overcomes the effective use of hydrodynamic suspension or (2) the bar straightness is out of the operational condition for this method of vibration dampening.

Hydrodynamic suspension in a barfeeding device is provided by a simple recirculating, non-pressurized flow of oil between the outside diameter of the spinning bar and the inside diameter of the guide channel to allow the bar to find its natural line of least resistance, which in a straight bar, is the center of the channel. This allows the bar of whatever length and diameter to spin at the required RPM silently and with no vibration. The oil should be of a viscosity to provide adequate hydrodynamic suspension but the barstock should spin relatively free of the oil in the transition area between the barfeeder and the lathe so as not to introduce tramp oil into the lathe coolant. The latter requirement prevents the use of heavier viscosity oils that may provide better vibration dampening qualities. When the mass of the bar material or the lack of straightness overcome the hydrodynamic suspension of the barfeeding device the lathe RPM must be reduced, compromising productivity, or quality is compromised.

BRIEF SUMMARY OF THE INVENTION

The present invention makes use of a variable viscosity fluid, such as electro- (ER) or magneto-rheological (MR) fluid to provide the dynamic vibration dampening support that the current oil in use cannot. Early work on ER fluids was done by Willis Winslow. "Induced Vibration of Suspensions," Journal of Applied Physics, 20 (1949) 1137–1140 and U.S. Pat. No. 2,417,850 for "Method and Means for Translating Electrical Impulses into Mechanical Force." The first work on MR fluids was done by Jacob Rabinow. "The Magnetic Fluid Clutch," AIEE Transactions, 67 (1948) 1308–1315 and U.S. Pat. No. 2,575,360 for "Magnetic Fluid Torque and Force Transmitting Device."

Magnetic rheological fluid, or magneto-rheological fluid is a free flowing liquid that "freezes" instantly when a strong magnetic field is brought near. These liquids are currently in use in some commercial products, such as Stairmaster exercise equipment and special shock absorbers for truck seats and automobile suspensions. For example, Cadillac's new "Stabili-ride" makes use of shocks filled with MR fluid. Road condition information is fed into a processor which outputs the appropriate electrical current to electromagnetic devices in each of the four shock absorbers for dynamic ride control. Electro-rheological fluids are used or have potential for similar applications.

In view of the above, it is an object of the present invention to provide a method and apparatus for varying the hydrodynamic suspension of barstock in a barfeeder by using an electro- or magneto-rheological fluid. It is another object to provide a method and apparatus which varies the viscosity of the oil in a barfeeder in a manner that minimizes the introduction of tramp oil into the lathe. It is a further object to provide a barfeeder which can be used over a wider range of barstock diameters without changing the guide channel. Other objects and features of the invention will be in part apparent and in part pointed out hereinafter.

In accordance with the invention, a barstock feeder for a lathe having a guide channel for encasing barstock in a hydrostatic oil bearing is improved by using an electro- or magneto-rheological fluid for the bearing and by providing means for selectively applying an electric or magnetic field to the guide channel for changing the viscosity of the fluid in the guide channel.

The invention also provides a method for damping vibrations in a barstock feeder for a lathe having a guide channel for encasing barstock in a hydrostatic oil bearing by providing an electro- or magneto-rheological fluid as the hydrostatic oil bearing and selectively applying an electric or magnetic field to the guide channel for changing the viscosity of the fluid in the guide channel.

The following patents are incorporated by reference herein: U.S. Pat. Nos. 6,267,364, 6,189,426, 6,095,486, 5,957,016, 5,829,319, 5,138,918, 4,941,782, 4,733,758 and 3,660,949 and Japanese patent No. 05212643A. The following articles are also incorporated by reference herein: "Curing the Shakes" by James R. Koelsch, Machine Shop Guide Magazine, December/January 2000 issue; "The Long and Short of Bar Feeder Selection" by Ray Varady and Leo Rakowski, Production Machining, July/August 2001 issue and "Engineering Note Designing with MR Fluids," Lord Materials Division, Lord Corporation, Cary, N.C.

The invention summarized above comprises the constructions and methods hereinafter described, the scope of the invention being indicated by the subjoined claims.

DETAILED DESCRIPTION OF THE INVENTION

Figure 1:
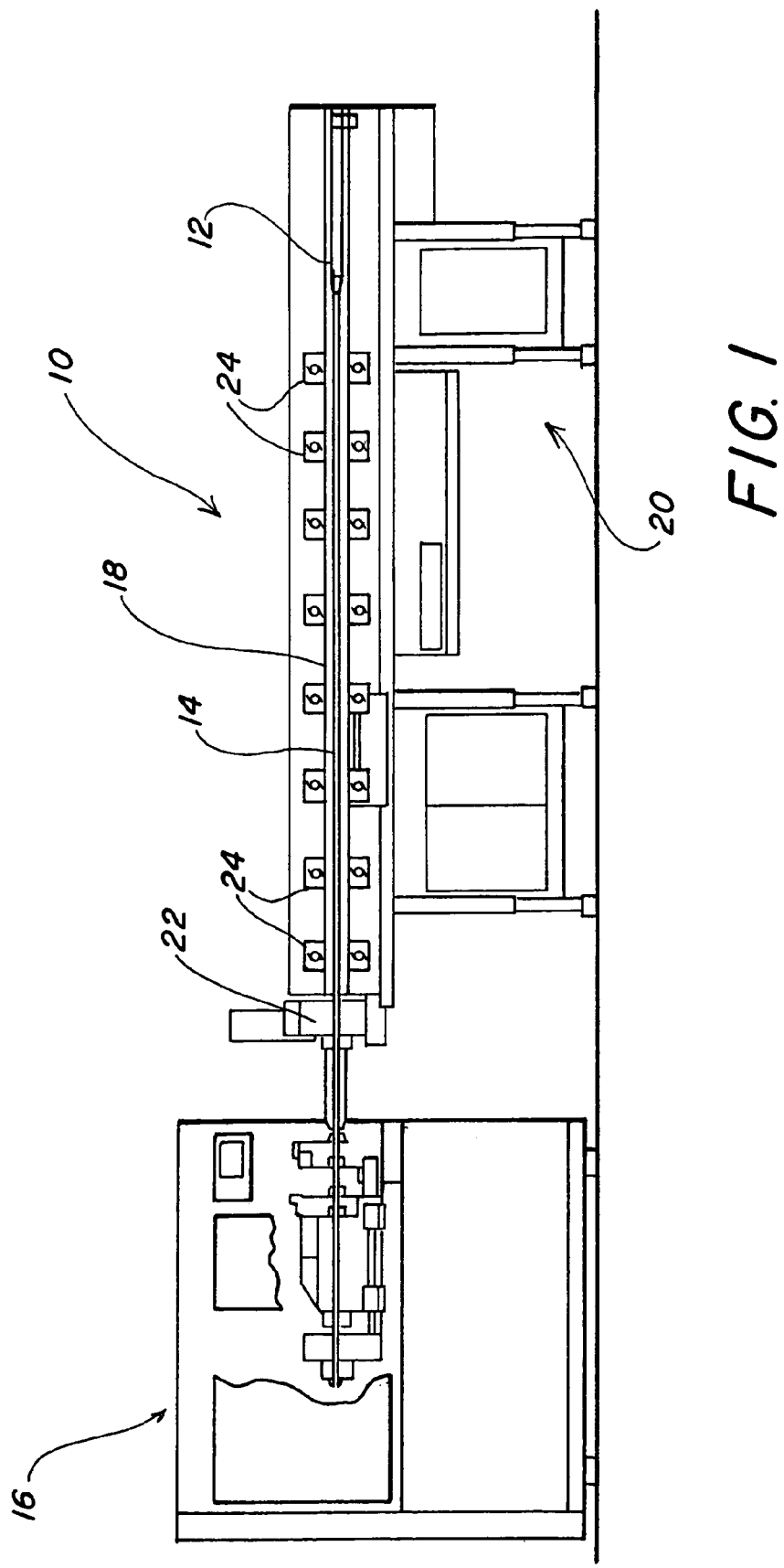
FIG. 1 is a side elevation of a vibration dampened barfeeder in accordance with the present invention shown pushing a barstock into a lathe.

Turning to FIG. 1, a barfeeder 10 is shown including a pushrod 12 for advancing a barstock 14 into a lathe 16. A guide channel 18 surrounds barstock 14. A magneto-rheological oil is circulated by a pump 20 through guide channel 18 to support barstock 14 hydrodynamically and to damp bar whip and vibration. A nose piece 22 is provided to remove oil from barstock 14 before it is fed into lathe 16. One or more electromagnetic coils 24 are provided on guide channel 18 for applying a magnetic field to the magneto-rheological oil for changing the viscosity of the oil appropriate to damp the vibrations in barstock 14. While electromagnetic coils 24 are preferred, it will be understood that permanent magnets may be used instead. The magnetic field applied along guide channel 18 may be varied such that the oil is less viscous as barstock 14 approaches nose piece 22 so that the oil can be more effectively removed. The viscosity of the fluid may also be selectively controlled such that the viscosity in the fluid is lessened behind barstock 14 as the barstock is pushed through barfeeder 10.

Figure 2:
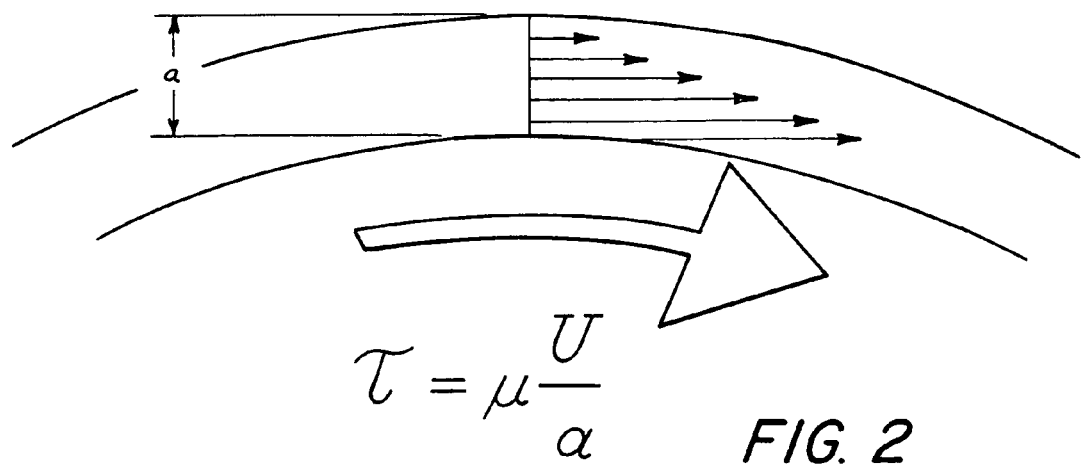
FIG. 2 is a drawing illustrating the relationship between viscous shear and the viscosity of the oil, surface speed of the rotating barstock and height of the bearing gap.

The magnetic field may be varied so that the same guide channel 18 may be used with barstock 14 over a wider range of diameters. With a conventional hydrostatic bearing, different guide channels 18 must be used for different diameter barstock because it is the viscous shear force, $\tau$, that maintains centricity and mitigates vibration. As shown in FIG. 2, shear force, $\tau$, is a function of $\mu$ (viscosity of the oil), U (surface speed of the barstock) and a (height of the bearing gap). Hence, barstocks with smaller diameters in a given guide channel 18 have more tendency to whip and vibrate. By applying a magnetic field to a magneto-rheological oil, it is possible to maintain centricity and mitigate vibration by increasing viscosity, $\mu$, by the same proportional amount as a (height of the bearing gap).

Figure 3:
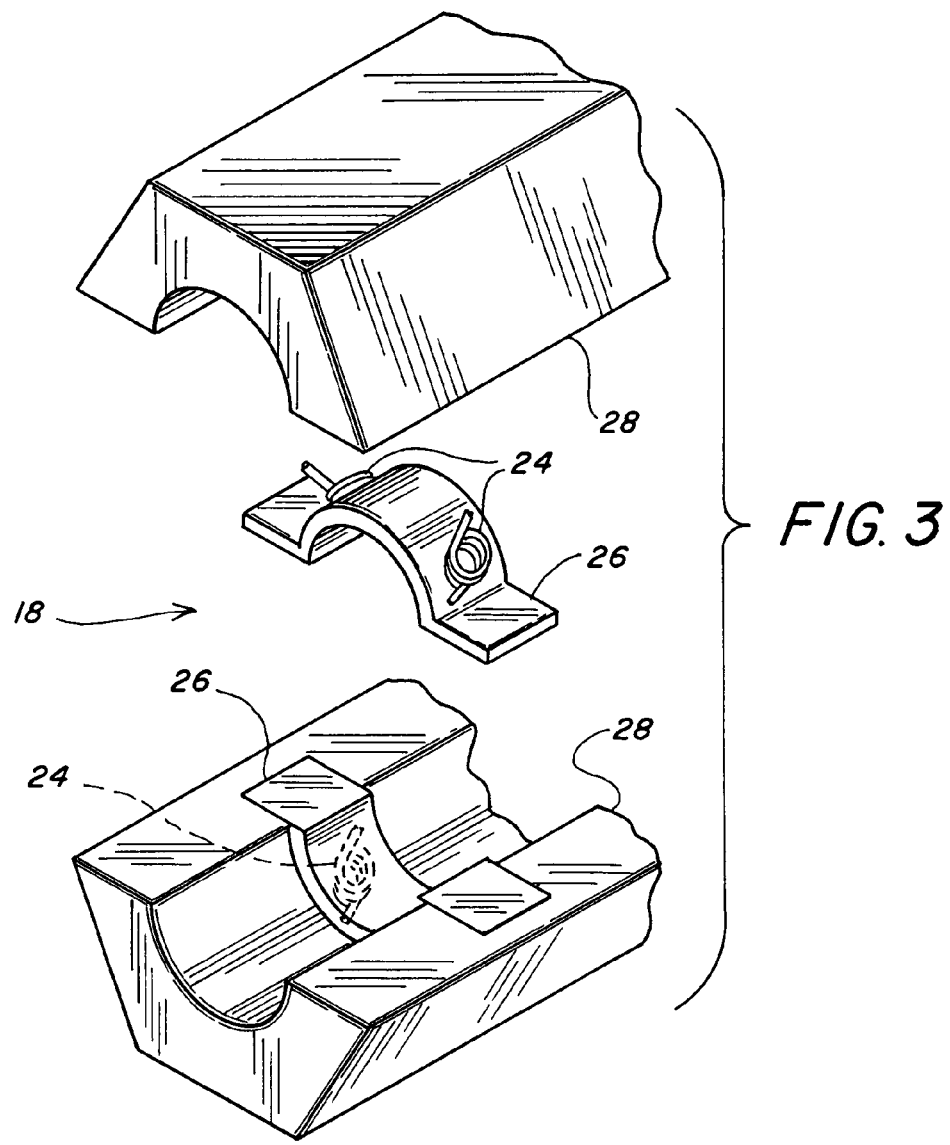
FIG. 3 is a perspective view of a guide channel with leafs set into a molded guide and electromagnetic coils positioned on selected leafs; and, FIG. 4 is a drawing showing position-dependent field lines associated with an electromagnetic coil.
Figure 4:
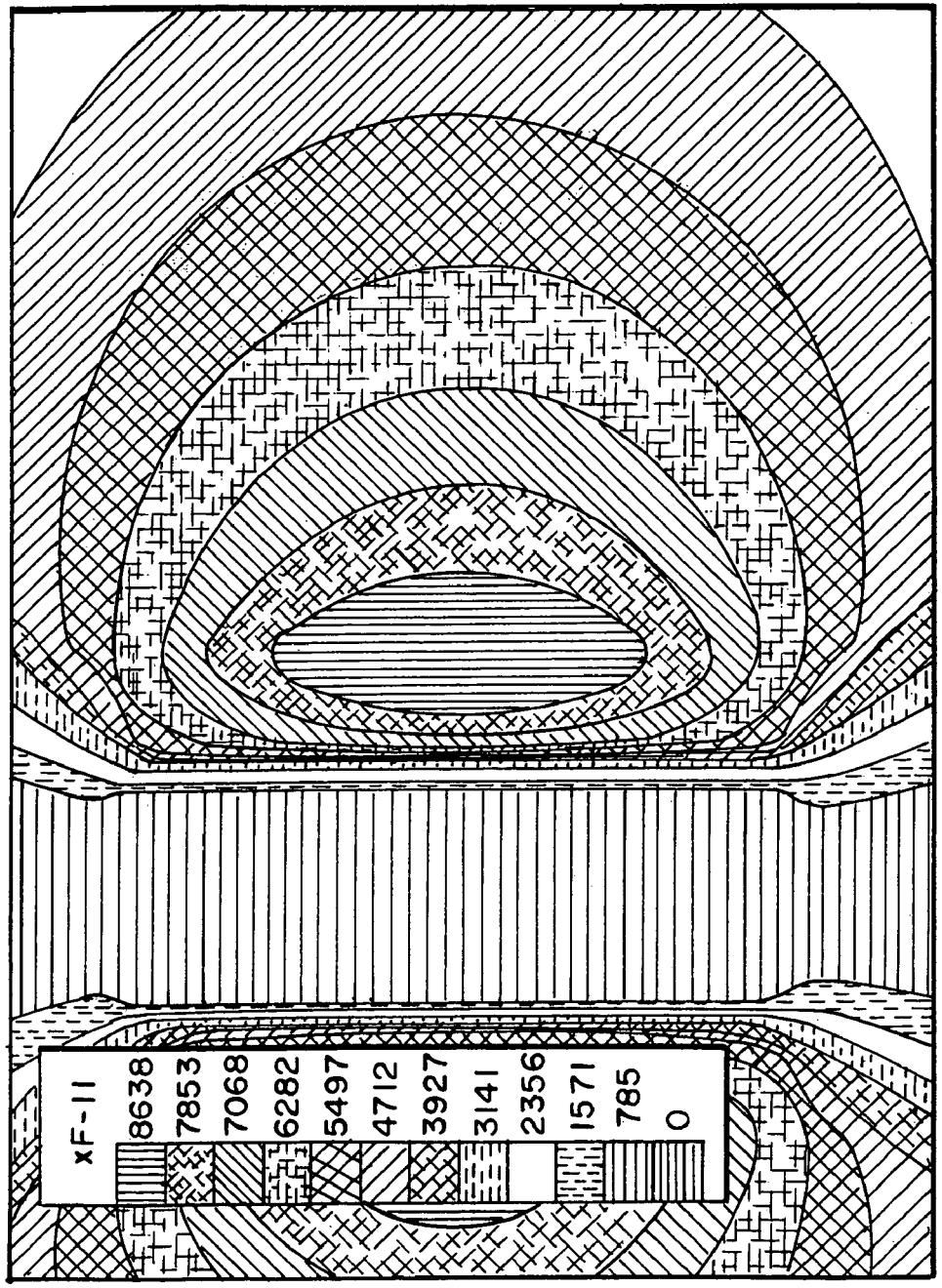

As shown in FIG. 3, guide channel 18 may be formed in two halves that close around barstock 14 with spring steel leafs 26 in a molded rubber guide 28. Magnetic coils 24 may be positioned on guide channel 18 as shown in FIG. 3 on selected steel leafs 26. As shown in FIG. 4, each coil creates its own local field. The viscosity increases towards the center of the coil and decreases radially outwardly. The level of electrical current supplied to each coil 24 determines the field strength and resultant viscosity level of the magneto-rheological oil. Hence coils 24 may be independently energized for local, multi-axis control of the fluid viscosity as needed.

The liquid vehicle for the magneto-rheological oil may be selected from those vehicles used for MR fluid compositions. Included materials are mineral oil, synthetic hydrocarbon oil, silicone oil, water, glycol, synthetic ester, perfluorinated polyether and so forth. Polarizable particles include carbonyl iron, powdered iron, iron/cobalt allows, nickel alloys and the like. The particles typically are about 1 to 10 microns in size. The oil may contain other additives including suspending agents, thixotropes, anti-wear and anti-corrosion additives, friction modifiers, etc.

The application of MR or ER fluid technology to barfeeding systems can be controlled in one or a combination of three methods:

Statically-always on. This can be programmed into the bar loading, barfeeding cycle to provide continuous support regardless of vibration conditions.

Manually-operator controlled. The operator of the lathe-barfeeder can control the amount of current provided to the electromagnets in the barfeeder guide channel support system through a simple rheostat for manual vibration control as needed.

Dynamically-vibration inputs through a PLC. Vibration detection instruments within the barfeeder guide channel support system can provide information to a PLC to control the electromagnets providing millisecond control of varying degrees of viscosity to dampen bar whip and vibration within the bar feeding device.

In view of the above, it is seen that MR or ER fluid in a barfeeding device provides a hydrodynamic support for bar whip and vibration dampening that has not been possible with oils having a constant viscosity. It will also be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed is:

1. In a barstock feeder for a lathe having a guide channel for encasing a barstock in a hydrostatic oil bearing, the improvement wherein the oil is an electro- or magneto-rheological fluid and means are provided for selectively applying an electric or magnetic field to the guide channel to dampen vibration of the barstock by changing the viscosity of the fluid in the guide channel only around the barstock.

2. The feeder of claim 1 wherein the magneto-field means comprises a plurality of electromagnetic coils, permanent magnets or a combination thereof.

3. The feeder of claim 2 wherein the magneto-field means are arranged so that the magneto-rheological fluid is more viscous at a nose piece end of the guide channel.

4. The feeder of claim 2 wherein the magneto-field means are arranged so that the magneto-rheological fluid is less viscous behind the barstock as the barstock is pushed through the barfeeder.

5. In a barstock feeder for a lathe having a guide channel formed in two sections for encasing a barstock in a hydrostatic oil bearing, each said section having steel leafs in a molded guide, the improvement wherein the oil is a magneto-rheological fluid and means are provided for selectively applying a magnetic field to the guide channel to dampen vibration of the barstock by changing the viscosity of the fluid in the guide channel only around the barstock.

6. The feeder of claim 5 wherein the magneto-field means are a plurality of electromagnetic coils positioned on selected leafs.

7. The feeder of claim 6 wherein the electromagnetic coils are independently energized for local, multi-axis control of the viscosity of the magneto-rheological fluid.

8. A method for damping vibrations in a barstock feeder for a lathe having a guide channel for encasing barstock in a hydrostatic oil bearing wherein the improvement comprises providing an electro- or magneto-rheological fluid as the hydrostatic oil bearing and selectively applying an electric or magnetic field to the guide channel to dampen vibration of the barstock by changing the viscosity of the fluid in the guide channel only around the barstock.

9. The method of claim 8 wherein the magneto-field means comprises a plurality of electromagnetic coils and current is continuously passed through the coils for providing continuous support to the barstock regardless of vibration conditions.

10. The method of claim 8 wherein the magneto-field means comprises a plurality of electromagnetic coils and current is manually controlled by an operator for providing vibration control as needed.

11. The method of claim 8 wherein the magneto-field means comprises a plurality of electromagnetic coils and current is controlled by a programmable logic controller in response to signals received by vibration detection instruments within the guide channel for providing vibration control as needed.

12. The method of claim 8 wherein the guide channel is formed in two sections, each said section having steel leafs in a molded guide, and wherein the magneto-field means comprises a plurality of electromagnetic coils positioned on selected leafs, said method further comprising independently energizing said electromagnetic coils for local, multi-axis control of the viscosity of the magneto-rheological fluid.

* * * * *